(12) United States Patent
Kitchen

(10) Patent No.: US 10,911,485 B2
(45) Date of Patent: Feb. 2, 2021

(54) PROVIDING CROSS SITE REQUEST FORGERY PROTECTION AT AN EDGE SERVER

(71) Applicant: Cloudflare, Inc., San Francisco, CA (US)

(72) Inventor: David Alexander Kitchen, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 314 days.

(21) Appl. No.: 15/991,237

(22) Filed: May 29, 2018

(65) Prior Publication Data
US 2019/0373016 A1 Dec. 5, 2019

(51) Int. Cl.
H04L 29/06 (2006.01)
H04L 29/08 (2006.01)
H04L 29/12 (2006.01)
H04L 9/32 (2006.01)

(52) U.S. Cl.
CPC ........ H04L 63/1466 (2013.01); H04L 9/3213 (2013.01); H04L 61/1511 (2013.01); H04L 67/2842 (2013.01); H04L 67/02 (2013.01)

(58) Field of Classification Search
CPC ............... H04L 63/1466; H04L 9/3213; H04L 61/1511; H04L 67/2842; H04L 67/02
See application file for complete search history.

(56) References Cited

U.S. PATENT DOCUMENTS

| | | | | |
|---|---|---|---|---|
| 8,949,277 B1* | 2/2015 | Lieuwen | ............. | G06F 16/3334 707/794 |
| 9,282,088 B2* | 3/2016 | Chin | ....................... | H04L 63/08 |
| 9,455,972 B1* | 9/2016 | Dotan | ..................... | H04L 9/321 |
| 9,755,834 B1* | 9/2017 | Johnson | ............. | H04L 63/1466 |
| 10,356,128 B1* | 7/2019 | Lango | ..................... | H04L 67/10 |
| 2011/0131635 A1* | 6/2011 | Schneider | ........... | H04L 63/1441 726/5 |
| 2011/0258704 A1* | 10/2011 | Ichnowski | .......... | H04L 63/1483 726/26 |
| 2013/0047266 A1* | 2/2013 | Radhakrishnan | ....... | G06F 21/40 726/28 |
| 2013/0117817 A1* | 5/2013 | Gantman | ............ | H04L 63/1466 726/4 |
| 2015/0319189 A1* | 11/2015 | Maher | ................. | H04L 63/1466 726/22 |
| 2017/0041144 A1* | 2/2017 | Krapf | ....................... | G06F 21/44 |
| 2019/0028456 A1* | 1/2019 | Kurian | ................. | H04L 63/083 |
| 2019/0103968 A1* | 4/2019 | Srinivasan | ............. | G06F 21/41 |
| 2020/0159776 A1* | 5/2020 | Kitchen | ................ | G06F 16/245 |

* cited by examiner

*Primary Examiner* — Sarah Su
(74) *Attorney, Agent, or Firm* — Nicholson De Vos Webster & Elliott LLP (57) ABSTRACT

An edge server receives a request from a client device to access a resource. The edge server determines whether the requested resource includes a tag within the code of the resource. When the edge server determines there is the tag in the resource, the edge server generates a token, associates the token with the resource (e.g., inserts the token in the code of the resource), and sends the resource to the requesting client device. In response to subsequent requests from the client device for actions to be performed with respect to the resource, the edge server determines whether the action requires a token. When the requested action requires the token, the edge server extracts the token in the request and processes the request after validating the token.

18 Claims, 4 Drawing Sheets

PROVIDING CROSS SITE REQUEST FORGERY PROTECTION AT AN EDGE SERVER

FIELD

Embodiments of the invention relate to the field of network communications; and more specifically, to providing cross site request forgery protection at an edge server.

BACKGROUND

Cross site request forgery (commonly abbreviated as both "CSRF" and "XSRF") is a common web vulnerability. CSRF occurs when attackers are able to transmit unauthorized or malicious requests to a website from a user that the website trusts. In some cases, CSRF attacks can force the user to perform state changing requests, including transferring bank account funds, changing email addresses or passwords, and other unwanted modifications or transferences of data, including comment spam.

To mitigate against CSRF, a token implementation may be used by the origin server. When a visitor visits a web page of the origin server, the origin server creates a randomly generated token string and embeds that token into the form. When the visitor submits the form, the random token is returned to the origin server. The origin server then compares the token returned and the token it generated to see if they match. If they match, the form action is processed. If not, the form action is not processed. Since a potential attacker cannot access the random token value created in the web page, if they request the web page, the origin policy would prevent the attacker from reading the response. This token implementation increases the burden on the origin server to check the validity of the tokens with each request. Also, issues can occur if a visitor has multiple browser windows open or other conditions that involve different software making the request.

Another way of mitigating CSRF involves the use of cookies. A cookie can be issued to the browser that includes a random token. A client-side script (e.g., JavaScript) can read the value of the token in the cookie and copy it into an HTTP header that is sent with each request. If a genuine request is sent from the visitor, the value in the header can be verified by the server. Any other instances will fail thereby mitigating an attack.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In an embodiment, an edge server provides CSRF protection at the edge. The edge server determines that a resource includes a token tag. In some embodiment, the token tag indicates to the edge server to generate a token when the resource is sent in response to requests for the resource, and subsequently the edge server should validate the token when subsequent requests for the resource include requests for certain actions to be performed on the resource. In addition, the token tag indicates a location for token placement in the resource. The edge server generates a token value and sends the resource include the token value to a client device in response to a request for the resource from the client device. In an embodiment, the edge server receives a second request from the client device, subsequent to the first request, for an action to be performed on the resource. In response, the edge server determines whether the action to be performed on the resource is of a type requiring a token and token validation. For example, a state-changing request may require token validation, while a non-state-changing request may not require token validation. In some embodiments, the edge server validates the token when the request is for a particular pattern (e.g., URL pattern) or for a particular type of action (e.g., POST, PUT, etc.). When the request is of a type requiring token validation, the edge server determines whether the second request includes a valid token (e.g., the token in the received second request matches the token sent to the client device in response to the previous request for the resource). When the received token is valid, the edge server sends the request to the origin server for performance of the action on the resource, or otherwise processes the request. When the received token is not valid or is expired, the edge server stops processing the request and returns and error indication to the client device.

In prior CSRF solutions, a web application inserts a token in a hidden field or a header of a resource (e.g., a webpage) using a secret key known by the edge server and/or the origin server. In other prior solutions, a secure cookie is used for CSRF protection. However, using a secure cookie as a CSRF solution is limited to HTTPS traffic and resources, and does not work with non-HTTPs traffic and JavaScript applications. In other prior solutions to address CSRF, a single CSRF token is used for a user session. This can lead to problems when the user is browsing between multiple tabs and switches between the multiple tabs, and then attempts to complete a form in an earlier accessed tab, resulting in a token error. In other problematic solutions, static or non-time-limiting CSRF tokens are used, which can be obtained by malicious actors.

Embodiments of the invention provide many technical advantages, in addition to addressing the deficiencies of previous solutions. By utilizing token tags in a resource to indicate the resource may require a token when accessed, or when certain actions are requested for performance on the resource, the edge server can cache resources from origin servers that could not typically be cached. For example, in previous CSRF solutions, the edge servers are unable to store the resource in the cache when a token is stored in the resource itself, despite all other aspects of the resource being static. However, in embodiments of the invention, the edge server is able to cache a resource, such as an HTML webpage that includes a login form, because the edge server generates the token after retrieving the resource from the cache and prior to sending the resource in response to a request for the resource to the requesting device. Further, because embodiments of the invention determine the presence of a token tag and replaces the token tag with the CSRF token prior to sending the resource to a requesting client device, this solution applies to different types of traffic including HTTP and HTTPs and works with JavaScript applications.

In addition, performing the CSRF protection at the edge server instead of at the origin server saves bandwidth throughout a network by preventing the sending of data requests that are determined to not pass the CSRF protection and could be an attack or malicious exploitation of a network resource. In addition, by preventing these types of attacks from reaching the origin server associated with the request, computing resources of the origin server are saved through preventing the origin server from having to process these requests. For example, the origin server does not have to dedicate resources to handling security threats posed by CSRF.

Further, because edge servers perform the CSRF protection, website owners can allocate less computing resources to implement CSRF protection. In some embodiments, website owners need only include the token tag in the code associated with their resources (e.g., websites). The edge server performs the operations to execute the CSRF protection on behalf of the website owner when it detects or identifies the token tag in the code. In this manner, by performing the CSRF protection on behalf of all traffic that arrives at the edge server, the CSRF protection afforded by the edge server is consistent and uniform without regard to the website or resource, and without requiring the website owners to significantly modify their code.

Figure 1:
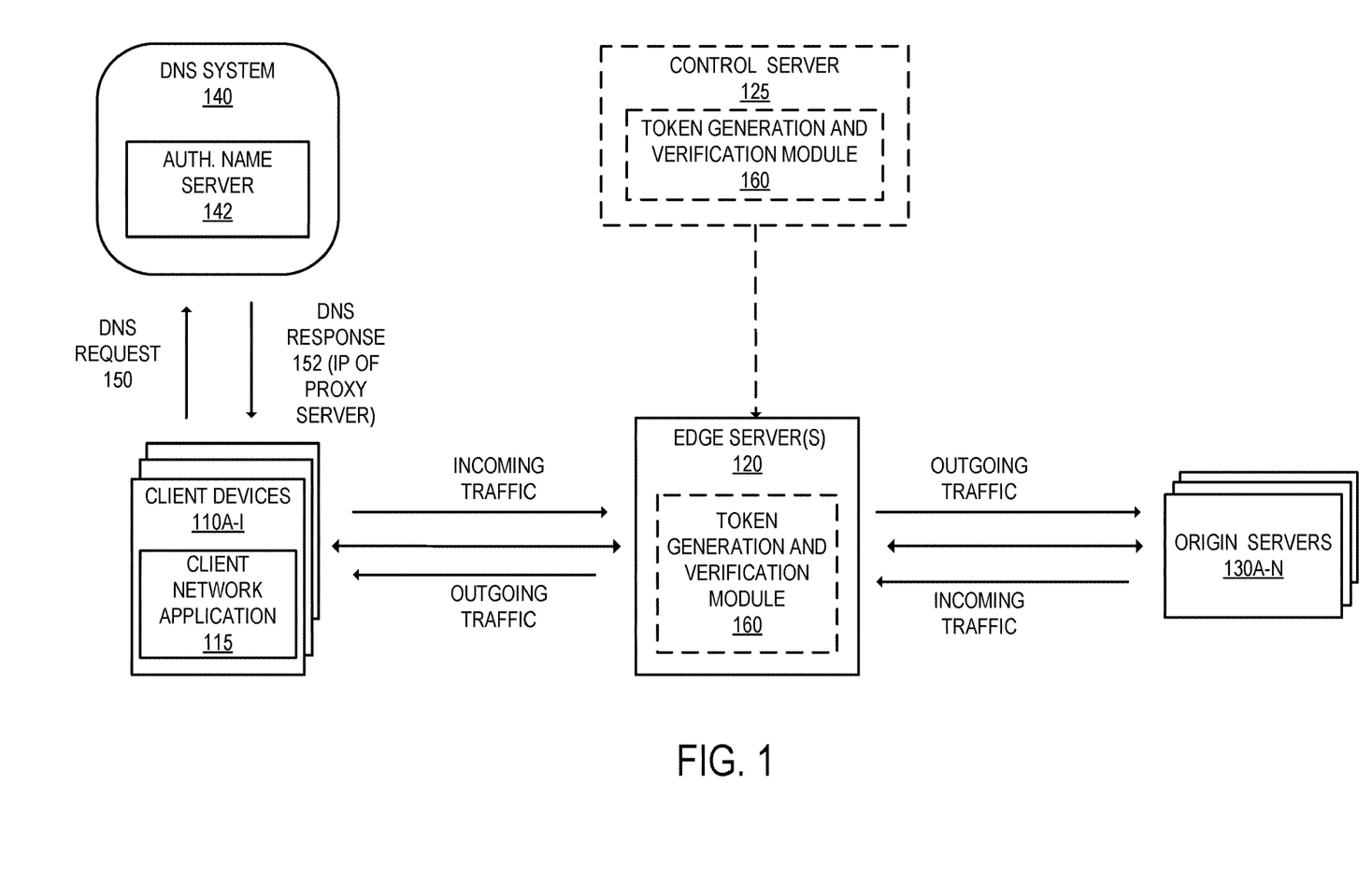
FIG. 1 illustrates an exemplary system according to some embodiments described herein.

FIG. 1 illustrates an exemplary network architecture that use embodiments described herein. The service illustrated in FIG. 1 includes edge server(s) 120 that are situated between client computing devices 110A-I and origin server(s) 130A-N. In one embodiment, edge server(s) 120 are reverse proxy servers. In one embodiment, certain network traffic is received and processed through edge server(s) 120. For example, web traffic (e.g., HTTP requests/responses, HTTPS requests/responses, SPDY requests/responses, HTTP/2 requests, responses, etc.) for domains handled by origin servers 130A-N may be received and processed at edge server(s) 120. In one embodiment, domain owners are customers of the cloud-based edge service and certain network traffic for their websites are received and processed at edge server(s) 120.

Client devices 110A-I are computing devices (e.g., laptops, workstations, smartphones, palm tops, mobile phones, tablets, gaming systems, set top boxes, wearable devices, electronic devices, etc.) that are capable of transmitting and/or receiving network traffic. Each of client devices 110A-I executes client network application 115 that is capable of transmitting and/or receiving network traffic. For example, client network application 115 may be a web browser or other application that can access network resources (e.g., web pages, images, word processing documents, PDF files, movie files, music files, or other computer files). Client devices 110A-I may each make DNS request 150 to DNS system 140 for a particular hostname and receive DNS response 152 that includes an IP address of edge server(s) 120.

Origin servers 130A-N are computing devices that may serve and/or generate network resources (e.g., web pages, images, word processing documents, PDF files movie files, music files, or other computer files). Origin server 130A-N may also be another edge server to the server that serves and/or generates network resources. Although not illustrated in FIG. 1, it should be understood that the network resources of origin servers 130A-N may be stored separately from the device that responds to the requests. Some of origin servers 130A-N may handle multiple domains that resolve to edge server(s) 120. For example, a single origin server (e.g., origin server 130A) may handle multiple domains owned by the same domain owner or different domain owners through use of virtual hosting. In one embodiment, the virtual hosting is name-based virtual hosting where multiple websites (domains), which may or may not be owned or operated by the same domain owner, are hosted on the same IP address.

The service may provide different services for customers. By way of example, the service may provide services including protecting against Internet-based threats (e.g., CSRF, proactively stopping botnets, cleaning viruses, Trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In an embodiment and as described in greater detail later herein, the service generates and verifies/validates tokens received by edge server(s) 120 in requests from client devices 110A-I for resources hosted by origin servers 130A-N. In one embodiment, the service determines whether resources hosted by origin servers 130A-N include token tags. In such embodiments, the service identifies the token tags and generates and sends tokens with the resource to client devices 110A-I, where the service evaluates subsequent requests that require token validation (e.g., state-changing requests) to determine whether a valid token is included or associated with the request.

DNS system 140 is used to refer to the DNS system as a whole and includes multiple DNS servers to resolve DNS requests. As illustrated, DNS system 140 includes authoritative name server 142, which is an authoritative name server for the service. Authoritative name server 142 may be the authoritative name server for the domains hosted at origin servers 130A-N. It should be understood that DNS system 140 may include more DNS servers (e.g., preferred domain servers, top-level domain name servers, or other domain servers) than illustrated. It should also be understood that there may be multiple authoritative web servers for the service and they may be geographically distributed.

Although not illustrated in FIG. 1, in one embodiment the service includes multiple nodes (referred herein as "edge service nodes"). Each edge service node may include any of one or more edge servers, one or more control servers, one or more DNS servers (e.g., one or more authoritative name servers), and one or more other pieces of networking equipment (e.g., one or more routers, switches, hubs, etc.). The edge service node may be part of the same physical device or multiple physical devices. For example, the edge server(s), control server(s), and DNS server(s) may be virtual instances running on the same physical device or may be separate physical devices. Each edge service node may be part of a data center or a collocation site.

The service may also include control server 125, which may be owned or operated by the service. In one embodiment, control server 125 provides a set of tools and interfaces for customers (e.g., domain owners) to configure security settings of the service. In some embodiments, control server 125 may be used to send a command to edge server(s) 120 to perform the CSRF protection described herein. For example, control server 125 may receive a command from a website owner of a website (e.g., resource) handled by an origin server (e.g., origin server 130A) to perform the CSRF protection for resources associated with origin server 130A. In some embodiments, CSRF protection is enabled as a result of control server 125 receiving an indication of a selection to enable CSRF protection (e.g., via a button selection or a toggle switched to an "on" or "enabled" position). In some embodiments, the selection of the toggle switch causes edge server(s) 120 to modify code associated with a resource to enable CSRF protection. Similarly, CSRF protection may be disabled as the result of control server 125 receiving an indication of a selection to disable CSRF protection (e.g., via a button selection or a toggle switch of the button or the toggle switched to an "off" or "disabled" position).

In some embodiments, the service includes multiple edge servers that are geographically distributed. For example, in some embodiments, the service uses multiple edge service nodes that are geographically distributed to decrease the distance between requesting client devices and content. The authoritative name servers may have a same anycast IP address and the edge servers may have a same anycast IP address. As a result, when a DNS request is made, the network transmits the DNS request to the closest authoritative name server (in terms of the routing protocol metrics). That authoritative name server then responds with one or more IP addresses of one or more edge servers within the edge service node. Accordingly, a visitor will be bound to that edge server until the next DNS resolution for the requested hostname (according to the TTL ("time to live") value as provided by the authoritative name server). In some embodiments, instead of using an anycast mechanism, embodiments use a geographical load balancer to route traffic to the nearest edge service node.

To provide CSRF protection, the service generates and verifies token values received in requests by edge server(s) 120. For instance, control server 125 and/or edge server(s) 120 include token generation and verification module 160 that is configured to generate and send token values to client devices 110A-I and verify token values received from the client computing devices 110A-I in requests to access and/or modify resources handled by origin servers 130A-N.

Figure 2:
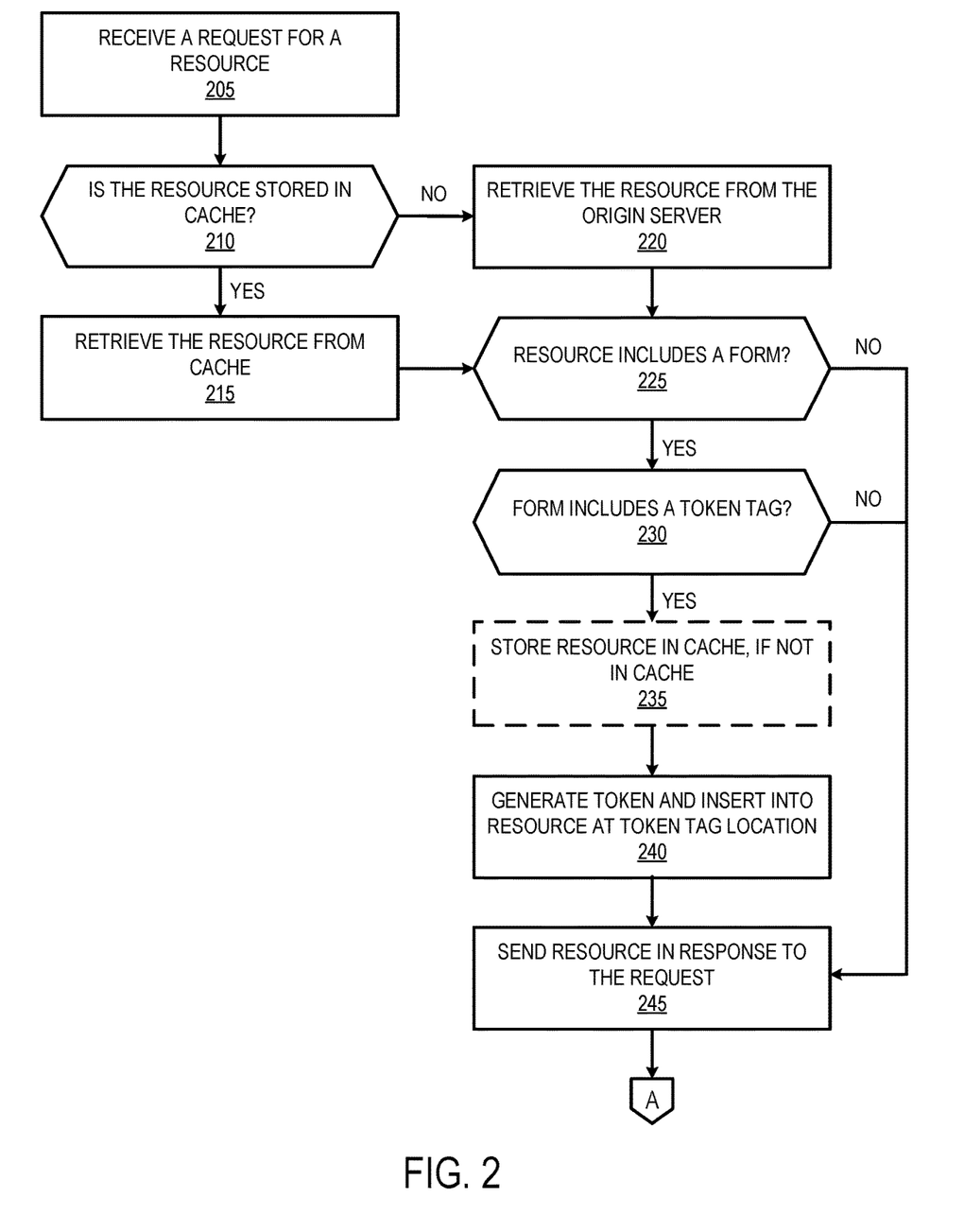
FIG. 2 is a flow diagram that illustrates exemplary operations for generating tokens for resources for providing CSRF protection, according to an embodiment.

FIG. 2 is a flow diagram that illustrates exemplary operations for generating tokens for resources for providing CSRF protection according to an embodiment. The operations of FIG. 2 and other flow diagrams will be described with reference to the exemplary embodiment of FIG. 1. However, it should be understood that the operations of FIG. 2 and the other flow diagrams can be performed by embodiments of the invention other than those discussed with reference to FIG. 1, and the embodiments discussed with reference to FIG. 1 can perform operations different than those discussed with reference to FIG. 2 and the other flow diagrams.

At operation 205, an edge server (e.g., one edge from set of edge servers 120) receives a request for a resource. The request may be received by edge server 120 as a result of a DNS for the hostname resolving to an IP address of edge server 120 instead of resolving to an IP address of origin server 130. In one embodiment, the requested resource is an HTML page located at, e.g., www.example.com. In one embodiment, edge server 120 receives the request for the resource from client network application 115 (e.g., a browser) operating on a client device (e.g., client device 110A). For example, edge server 120 receives a HTTP "GET" request to access a resource hosted by an origin server (e.g., origin server 130A).

At operation 210, edge server 120 determines whether the requested resource is stored in a cache associated with, or otherwise accessible by, edge server 120. When edge server 120 determines that the resource requested by client device 110A is available in the cache, the flow continues to operation 215. In operation 215, edge server 120 retrieves the requested resource from the cache. In one embodiment, edge server 120 retrieves the requested resource from the cache without sending the request to origin server 130A.

When edge server 120 determines that the resource requested by client device 110A is not available in the cache, or edge server 120 cannot access the requested resource in the cache, the flow continues to operation 220. In operation 220, edge server 120 retrieves the requested resource from origin server 130A. In one embodiment, edge server 120 sends send the HTTP request containing the "GET" request to origin server 130, and edge server 120 receives an HTTP response back from origin server 130.

After retrieving the requested resource from origin server 130 or from the cache, at operation 225, edge server 120 determines whether the retrieved resource includes a form, such as an HTML form. The form may be used to collect user input and include one or more input elements such as text fields, checkboxes, radio buttons, submit buttons, etc. The form may define an action to be performed when the form is submitted, such as when form data is sent to a server when the user clicks on a submit button. As an example, the retrieved resource may include an HTML form that includes one or more fields, such as login and password fields that allow for user authentication and access to secure data. When the resource includes a form, the flow continues to operation 230. When the resource does not include a form, the flow proceeds to operation 245, and edge server 120 sends the requested resource to client device 110A in response to the received request for the resource.

In operation 230, edge server 120 determines whether the form includes a token tag. In embodiments where the resource is comprised of HTML code, the token tag is included in the body of the HTML code to indicate the location for token placement in the HTML code. When edge server 120 determines that the form does not include the token tag, the flow proceeds to operation 245, and edge server 120 performs the actions as described above. When edge server 120 determines that the form does include the token tag, the flow proceeds to operation 240.

Optionally, edge server 120 stores the requested resource in the cache, in operation 235, when the requested resource was retrieved from the origin server 130, e.g., the requested resource was not in the cache or not accessible from the cache. In one embodiment, edge server 120 stores the resource in the cache prior to edge server 120 generating a token for the requested resource.

In operation 240, when edge server 120 determines that the form includes the token tag, the edge server 120 generates and inserts a token (e.g., a CSRF token) into the form. In one embodiment, after edge server 120 generates the token, edge server 120 inserts the generated token at the location of the token tag.

In one embodiment, edge server 120 configures the generated token to be valid for a default or user-configurable window of time. In one embodiment, edge server 120 stores the generated token in the cache, or in another data structure, as would be understood by one of ordinary skill in the art. In such embodiments, edge server 120 accesses the cache or data structure to retrieve the stored token in response to subsequent requests for actions to be performed on the resource, when the action requires token validation.

In one embodiment, edge server 120 generates the token by hashing a secret key and one or more other values using a hash algorithm. In some embodiments, the hash algorithm is a cryptographic hash algorithm, including, but not limited to, SHA-1, SHA-2, MD5, Whirlpool, and other cryptographic hash algorithms. In one embodiment, edge server 120 generates the token using a time-based one-time password algorithm (TOTP), using a shared secret key and the current time. The secret key may be a uniform shared secret for all websites or each website may have its own unique secret key. In one embodiment, where each website has its own secret key, edge server 120 stores the secret key in a profile associated with the corresponding website. The secret key may be a value used for symmetric encryption. In one embodiment, the secret key is known only by edge server 120 and is not sent to client device 110A. The one or more other values may include one or more of: zone information, metadata, including an IP address, a browser identifier, a host origin name, geo-location data, a device identifier, a user agent string, and other authentication data or user identifying information. In other embodiment, the token is generated using other methods, as would be understood by one of ordinary skill in the art.

In one embodiment, the IP address may be the source IP address associated with the received request (e.g., an IP address associated with client device 110A). The geo-location data associated with client device 110A may be obtained using the IP address and performing a lookup of the geo-location associated with the IP address. A user agent string may provide additional information including, but not limited to, a browser identifier, a browser version, and an operating system running on client device 110A. The host origin name may be the resource being requested (e.g., www.example.com). In addition, the host origin name may be used to determine the customer identifier. For example, using the host origin name, edge server 120 may perform a lookup operation using the host origin name, or alternatively, a destination IP address, to determine the corresponding customer identifier (e.g., owner of www.example.com). In some embodiments, the received request may also include a device identifier, such as a MAC address associated with client device 110A that initiated the request.

In one embodiment, the resource owner generates the token tag with metadata included. For example, the token tag can be in the form of "<!--CSRF sample-->", where "sample" is metadata. In such a scenario, edge server 120 generates a TOTP token that includes the metadata as an argument to the TOTP function/algorithm. In one embodiment, the resource owner further defines the mappings that require the use of a valid token before edge server 120 processes the requests. For example, where a map structure is "map[url][method]=metadata", the resource owner defines a mapping entry as: map["/endpoint.php"] ["POST"]= "sample". In such embodiments, in response to subsequent request from client device 110A for a particular path matching a mapping entry, e.g., a "POST" operation with a requested path matching "/endpoint.php", edge server 120 validates a token received in the request from the client device 110A when the token includes the requisite metadata, e.g., "sample."

Figure 3:
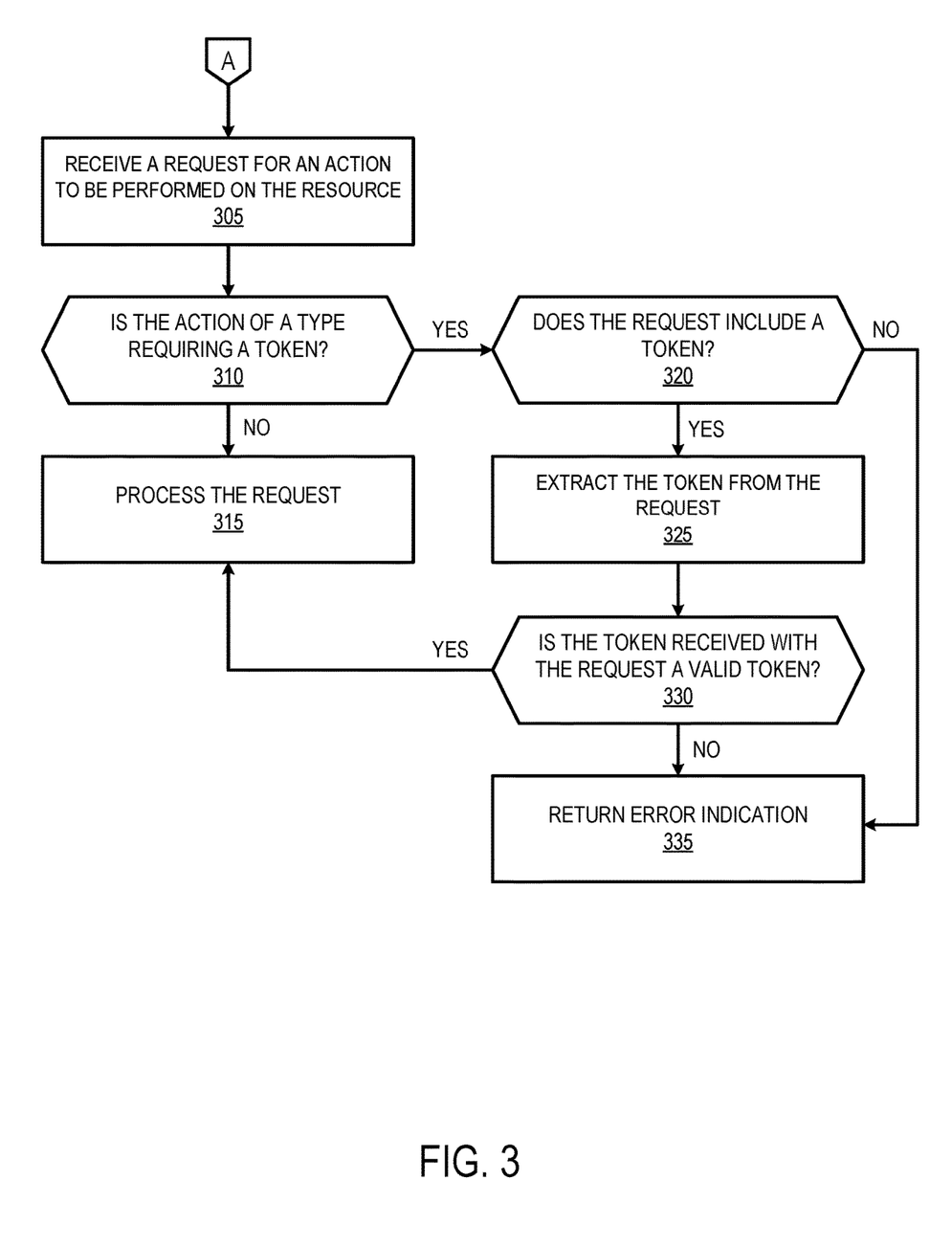
FIG. 3 is a flow diagram that illustrates exemplary operations for token validation for providing CSRF protection, according to an embodiment.

In operation 245, edge server 120 sends the requested resource with the generated token to client device 110A in response to the received request for the resource. In one embodiment, edge server 120 processes subsequent resource requests and provides CSRF protection (e.g., by proceeding with method 300 at block 305 via off-page connector A).

FIG. 3 is a flow diagram that illustrates exemplary operations for token validation for providing CSRF protection according to an embodiment. In one embodiment, edge server 120 provides CSRF protection in response to subsequent requests for resources after initially generating CSRF tokens for resources, as described in FIG. 2.

At operation 305, edge server 120 receives a request for an action to be performed on the resource. In one embodiment, edge server 120 receives the request for the resource from client network application 115 (e.g., a browser) operating on client device 110A. In one embodiment, the request is a second request for the resource subsequent to a previous request (e.g., the request received in operation 205 of FIG. 2).

At operation 310, edge server 120 determines the type of action received in the request, and determines if the type of action requires a token. In some embodiments, the action in the received request may be a non-state-changing request or state-changing requests. State-changing requests include modification to data or storage, such as posting of data to a website, uploading a file, and deleting data, and include POST, DELETE and PUT requests, among others. Non-state-changing requests retrieve data but have no effect on the data, and include GET and HEAD requests. In some embodiments, edge server 120 determines whether the request is a state-changing request based on the type of HTTP verb used in the request.

In one embodiment, edge server 120 receives client-provided configurations and settings via an interface, and edge server 120 stores the provided settings in client profiles. In one embodiment, the provided settings can include a blacklist of endpoints (e.g., URL patterns) and/or methods that require a token, a whitelist of endpoints and/or methods that do not require a token, or a combination of a blacklist and whitelist.

In some embodiments, edge server 120 accesses a specific client profile associated with the requested resource, where the profile includes a list of endpoints and/or a set of methods (e.g., action types) in which a token is required to be validated prior to process the requested action on the requested resource. The requirement for a token is triggered when edge server 120 determines that the action to be performed is to access an endpoint in the list of endpoints or perform a method included in the set of methods. In another embodiment, edge server 120 automatically requires a token with requests that include actions that are state-changing requests. In other embodiments, regardless of whether the request is a state-changing request or a non-state-changing request, the toke validation process is performed by edge server 120. When edge server 120 determines that the action type of the request requires a token, the flow continues to operation 320. When edge server 120 determines that the action type of the request does not require a token, the flow continues to operation 315.

At operation 315, edge server 120 processes the request when edge server 120 determines that the requested action to be performed on the resource does not require verifying a token with the request. In one embodiment, the request does not require a token when the action is not a state-changing request (e.g., an HTTP GET request), as there is less of a risk of data being manipulated or modified. In some embodiments, the request may include a token, but when the request type of the request is a non-state-changing request, edge server 120 may ignores the presence of the token and process the received request. In one embodiment, edge server 120 sends the request to the origin server 130 storing the requested resource. In another embodiment, edge server 120 determines whether the requested resource is available in a cache associated with edge server 120 and returns the cached resource, if retrievable, to the requesting client device 110A. In one embodiment, edge server 120 sends the request to the appropriate origin server 130 storing the requested resource. In another embodiment, edge server 120 decrypts the request and performs a set of one or more operations on the decrypted request.

At operation 320, when the action is of a type that requires a token, edge server 120 determines whether the request includes a token. When edge server 120 determines that the request includes a token when the requested action requires a token, the flow continues to operation 325.

When edge server 120 determines that the request does not include a token when the requested action requires a token, the flow continues to operation 335. In operation 335, edge server 120 returns an error indication to client device 110A indicating that the request failed or was denied. In one embodiment, edge server 120 does not process the request received from the client computing device 110 or send the HTTP request to the origin server 130.

At operation 325, when edge server 120 determines that the request includes the token, edge server 120 extracts the token from the request. In one embodiment, edge server 120 accesses a field in a custom header of the request containing the token. In another embodiment, edge server 120 accesses a portion of the body of the request containing the token. In another embodiment, edge server 120 receives the token from client device 110A separately from the request via a client-side script. In other embodiments, edge server 120 receives the token from client device 110A in another manner, as would be understood by one of ordinary skill in the art.

At operation 330, edge server 120 determines whether the token received with the request is a valid token. In one embodiment, where edge server 120 stores a token (e.g., the token previously generated by edge server 120 in operation 240 of FIG. 2), edge server 120 compares the received token value against a stored token value to determine whether the received token value and the stored token value match. In some embodiments, edge server 120 also determines the validity of the received token by determining whether the received token has expired by checking the expiration date/time of the received token. When edge server 120 determines the received token is not valid, the flow continues to operation 335. In operation 335, edge server 120 does not process the request received from the client computing device 110 or send the HTTP request to the origin server 130. In one embodiment, edge server 120 also generates and sends an error indication to client computing device 110A indicating that the request was rejected or could not be processed by edge server 120.

When edge server 120 determines the received token is valid, the flow continues to operation 315, and as described above, edge server 120 processes the request received from client device 110A. For example, when the received request for an action was an HTTP POST request, edge server 120 sends the HTTP POST request to the appropriate origin server 130A.

In another embodiment, when an edge server (e.g., edge server 120A) retrieves a resource from an origin server (e.g., origin server 130A), edge server 120A determines whether the resource includes one or more particular known fields (e.g., login/pw fields in an HTML page). In such embodiments, in response to determining that the resource includes one of more of the particular known fields, edge server 120A automatically generates a token and associates the token with the resource prior to transmitting the resource to a requesting client device. In such embodiments, edge server 120A performs the CSRF protection without the client (e.g., website owner) modifying the code for the resource.

Figure 4:
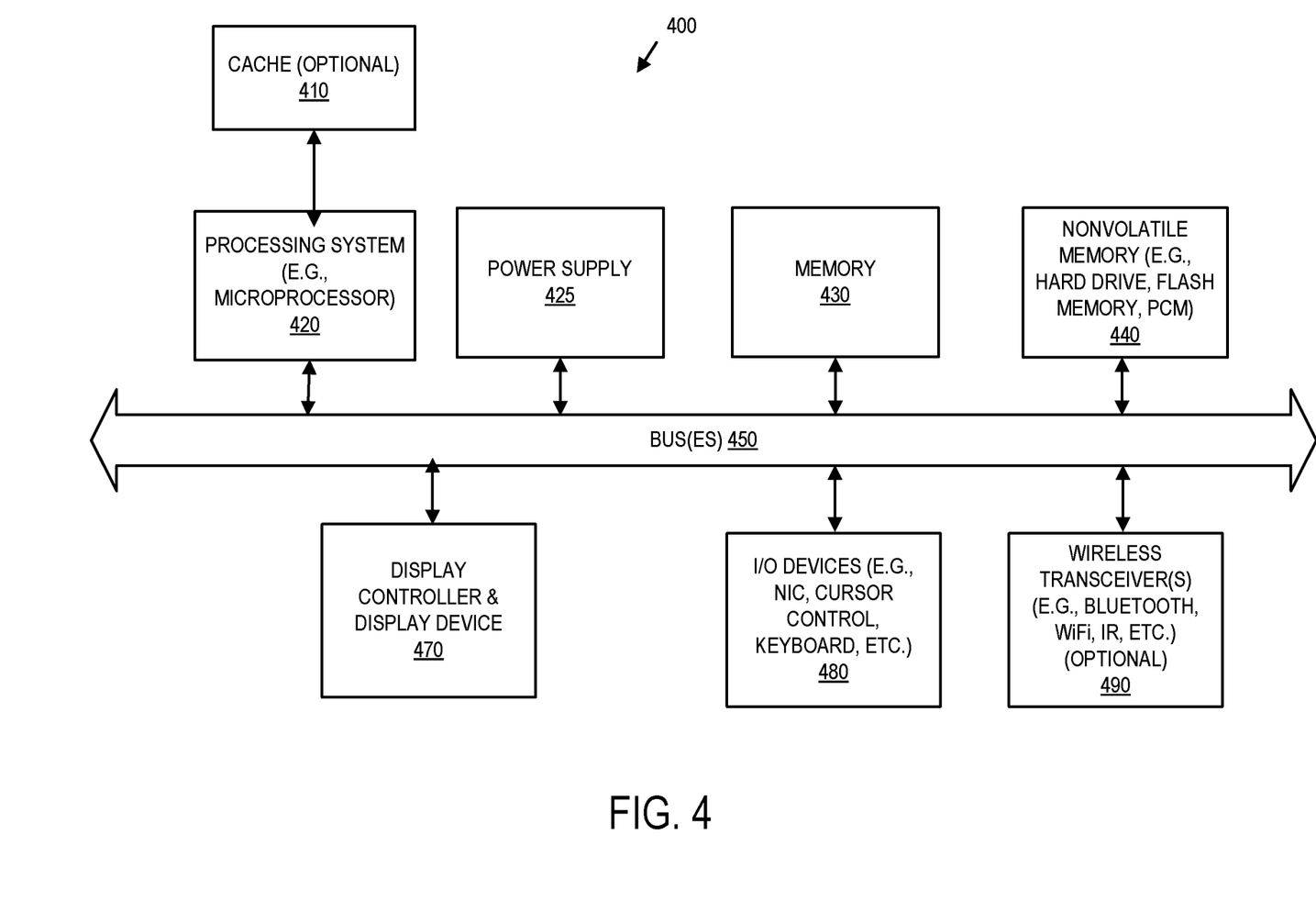
FIG. 4 is a block diagram illustrating a data processing system that can be used in an embodiment.

As illustrated in FIG. 4, the computer system 400, which is a form of a data processing system, includes the bus(es) 450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420, which is coupled to the optional cache 410, may retrieve instruction(s) from the memory 430 and/or the nonvolatile memory 440, and execute the instructions to perform operations described herein. The bus 450 interconnects the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the optional wireless transceiver(s) 490 (e.g., Bluetooth, Wi-Fi, Infrared, etc.). In one embodiment, the client device, caching system, and/or service device described herein may take the form of the computer system 400.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   determining, by an edge server, a resource includes a token tag indicating a location for token placement in the resource;
   generating a first token value;
   inserting the first token value at the location for token placement in the resource;
   sending the resource including the first token value to a client device in response to a first request for the resource;
   receiving, by the edge server, a second request from the client device for an action to be performed on the resource;
   determining that the action to be performed on the resource is of a type requiring a token by:
      accessing a profile associated with the resource, the profile including one or more of a list of endpoints and a set of methods requiring the token, and
      determining that the action to be performed is to access an endpoint in the list of endpoints or to perform a method in the set of methods stored in the profile;
   determining that the second request includes a valid second token value; and
   sending the second request to an origin server hosting the resource in response to determining that the second request includes the valid second token value.

2. The method of claim 1, further comprising:
   retrieving the resource from the origin server; and
   caching the resource including the token tag in a cache associated with the edge server prior to generating the first token value.

3. The method of claim 1, wherein determining that the second request includes the valid second token value comprises:
   extracting a second token value from the second request; and
   comparing the extracted second token value to the first token value generated by the edge server, wherein the second token value is valid when the second token value matches the first token value.

4. The method of claim 1, wherein the second request for the action to be performed is a state-changing request for the resource.

5. The method of claim 1, wherein the resource comprises HTML code and the token tag is included in the HTML code to indicate the location for token placement in the HTML code.

6. The method of claim 1, wherein the first token value is generated based on user identifying information and zone information retrieved in the first request for the resource.

7. A non-transitory machine-readable storage medium that provides instructions that, when executed by a processor, cause said processor to perform operations comprising:
   determining, by an edge server, a resource includes a token tag indicating a location for token placement in the resource;
   generating a first token value;
   inserting the first token value at the location for token placement in the resource;
   sending the resource including the first token value to a client device in response to a first request for the resource;
   receiving, by the edge server, a second request from the client device for an action to be performed on the resource;
   determining that the action to be performed on the resource is of a type requiring a token by:
      accessing a profile associated with the resource, the profile including one or more of a list of endpoints and a set of methods requiring the token, and
      determining that the action to be performed is to access an endpoint in the list of endpoints or to perform a method in the set of methods stored in the profile;
   determining that the second request includes a valid second token value; and
   sending the second request to an origin server hosting the resource in response to determining that the second request includes the valid second token value.

8. The non-transitory machine-readable storage medium of claim 7 that provides instructions that, when executed by the processor, cause the processor to further perform operations comprising:
   retrieving the resource from the origin server; and
   caching the resource including the token tag in a cache associated with the edge server prior to generating the first token value.

9. The non-transitory machine-readable storage medium of claim 7, wherein determining that the second request includes the valid second token value comprises:
   extracting a second token value from the second request; and
   comparing the extracted second token value to the first token value generated by the edge server, wherein the second token value is valid when the second token value matches the first token value.

10. The non-transitory machine-readable storage medium of claim 7, wherein the second request for the action to be performed is a state-changing request for the resource.

11. The non-transitory machine-readable storage medium of claim 7, wherein the resource comprises HTML code and the token tag is included in the HTML code to indicate the location for token placement in the HTML code.

12. The non-transitory machine-readable storage medium of claim 7, wherein the first token value is generated based on user identifying information and zone information retrieved in the first request for the resource.

13. An apparatus, comprising:
a processor;
a non-transitory machine-readable storage medium coupled with the processor that stores instructions that, when executed by the processor, cause said processor to perform the following:
   determine a resource includes a token tag indicating a location for token placement in the resource;
   generate a first token value;
   insert the first token value at the location for token placement in the resource;
   send the resource including the first token value to a client device in response to a first request for the resource;
   receive a second request from the client device for an action to be performed on the resource;
   determine that the action to be performed on the resource is of a type requiring a token by:
      accessing a profile associated with the resource, the profile including one or more of a list of endpoints and a set of methods requiring the token, and
      determining that the action to be performed is to access an endpoint in the list of endpoints or to perform a method in the set of methods stored in the profile;
   determine that the second request includes a valid second token value; and
   send the second request to an origin server hosting the resource in response to determining that the second request includes the valid second token value.

14. The apparatus of claim 13, wherein the instructions further cause said processor to perform the following:
   retrieve the resource from the origin server; and
   cache the resource including the token tag in a cache prior to generating the first token value.

15. The apparatus of claim 13, wherein determining that the second request includes the valid second token value comprises:
   extracting a second token value from the second request; and
   comparing the extracted second token value to the first token value, wherein the second token value is valid when the second token value matches the first token value.

16. The apparatus of claim 13, wherein the second request for the action to be performed is a state-changing request for the resource.

17. The apparatus of claim 13, wherein the resource comprises HTML code and the token tag is included in the body of the HTML code to indicate the location for token placement in the HTML code.

18. The apparatus of claim 13, wherein the first token value is generated based on user identifying information and zone information retrieved in the first request for the resource.

* * * * *